United States Patent
Terayama et al.

(10) Patent No.: US 12,459,216 B2
(45) Date of Patent: Nov. 4, 2025

(54) ROLLER UNIT FOR FEEDING TAPES, FIBER PLACEMENT APPARATUS AND METHOD OF MOLDING COMPOSITE MATERIAL

(71) Applicant: SUBARU CORPORATION, Tokyo (JP)

(72) Inventors: Daichi Terayama, Tokyo (JP); Tomoyoshi Kuniya, Tokyo (JP); Daisuke Hirabayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 34 days.

(21) Appl. No.: 18/459,578

(22) Filed: Sep. 1, 2023

(65) Prior Publication Data
US 2024/0100785 A1     Mar. 28, 2024

(30) Foreign Application Priority Data
Sep. 26, 2022    (JP) .................................. 2022-153128

(51) Int. Cl.
    *B29C 70/38*       (2006.01)
    *B29K 105/08*     (2006.01)

(52) U.S. Cl.
    CPC ........ *B29C 70/388* (2013.01); *B29K 2105/08* (2013.01)

(58) Field of Classification Search
    CPC ..... B29C 70/38; B29C 70/382; B29C 70/384; B29C 70/386; B29C 70/388; B29K 2105/08; F16C 13/00; B65H 18/16; B65H 27/00

See application file for complete search history.

(56) References Cited

U.S. PATENT DOCUMENTS

| | | |
|---|---|---|
| 8,893,758 B2 | 11/2014 | Genssen |
| 8,986,482 B2 | 3/2015 | McCowin et al. |
| 9,003,619 B2 | 4/2015 | Kawabe |
| 9,248,591 B2 | 2/2016 | Caffiau et al. |

(Continued)

FOREIGN PATENT DOCUMENTS

| | | | |
|---|---|---|---|
| FR | 3100154 A1 * | 3/2021 | ........... B29C 70/384 |
| JP | 2011-527648 A | 11/2011 | |

(Continued)

OTHER PUBLICATIONS

U.S. Appl. No. 18/459,601, filed Sep. 1, 2023, Hirabayashi, et al.

(Continued)

*Primary Examiner* — George R Koch
(74) *Attorney, Agent, or Firm* — Smith, Gambrell & Russell, LLP

(57) ABSTRACT

A roller unit aligns tapes in a width direction and feeds the aligned tapes. The tapes are made of fibers which have not been impregnated with resin or have been impregnated with the resin. The roller unit includes rollers and a support shaft. The rollers rotate by friction force between the tapes and the rollers when the rollers contact with the tapes. The rollers are aligned so that rotation axes of the rollers lie on a same straight line. Diameters of the rollers are same as each other. The support shaft supports the rollers rotatably at rotational speeds independent from each other.

20 Claims, 6 Drawing Sheets

(56) References Cited

U.S. PATENT DOCUMENTS

| | | |
|---|---|---|
| 11,529,773 B2 | 12/2022 | Takagi et al. |
| 11,548,241 B2 | 1/2023 | Yasukochi et al. |
| 11,597,168 B2 | 3/2023 | Kawabe et al. |
| 11,679,570 B2 | 6/2023 | Hirabayashi et al. |
| 2002/0042332 A1* | 4/2002 | Eronen .................. B65H 27/00 492/40 |
| 2010/0263167 A1 | 10/2010 | Fox |
| 2012/0135227 A1 | 5/2012 | Kawabe |
| 2014/0083620 A1* | 3/2014 | Caffiau .................. B29C 70/388 156/433 |
| 2020/0055263 A1 | 2/2020 | Takagi et al. |
| 2020/0190700 A1 | 6/2020 | Yasukochi et al. |
| 2021/0206122 A1 | 7/2021 | Kawabe et al. |
| 2022/0072813 A1 | 3/2022 | Hirabayashi et al. |
| 2022/0266545 A1 | 8/2022 | Hirabayashi et al. |
| 2022/0324185 A1* | 10/2022 | Hamlyn ................ B29C 70/388 |
| 2023/0226781 A1 | 7/2023 | Takenaka |
| 2023/0241847 A1 | 8/2023 | Kuniya |
| 2024/0100786 A1* | 3/2024 | Hirabayashi .......... B29C 70/388 |

FOREIGN PATENT DOCUMENTS

| | | |
|---|---|---|
| JP | 2014-519995 A | 8/2014 |
| JP | 2019-151726 A | 9/2019 |
| JP | 2020-059144 A | 4/2020 |
| JP | 2020-059145 A | 4/2020 |
| JP | 2020-093454 A | 6/2020 |
| JP | 2022-046379 A | 3/2022 |
| JP | 2022-130133 A | 9/2022 |
| JP | 2023-106261 A | 8/2023 |
| JP | 2023-111757 A | 8/2023 |
| WO | 2010/137525 A1 | 12/2010 |
| WO | 2018/168202 A1 | 9/2018 |

OTHER PUBLICATIONS

Extended European Search Report mailed Feb. 27, 2024 for European Patent Application No. 23195003.1 (7 pages) [European Counterpart of U.S. Appl. No. 18/459,578].

Extended European Search Report mailed Feb. 27, 2024 for European Patent Application No. 23197835.4 (7 pages) [European counterpart of U.S. Appl. No. 18/459,601].

Non Final Office Action mailed Feb. 27, 2025 in U.S. Appl. No. 18/459,601 (41 pages).

Final Office Action mailed Aug. 15, 2025 in U.S. Appl. No. 18/459,601 (24 pages).

* cited by examiner

ROLLER UNIT FOR FEEDING TAPES, FIBER PLACEMENT APPARATUS AND METHOD OF MOLDING COMPOSITE MATERIAL

CROSS REFERENCES TO RELATED APPLICATIONS

This application is based upon and claims the benefit of priority from Japanese Patent Application No. 2022-153128, filed on Sep. 26, 2022; the entire contents of which are incorporated herein by reference.

FIELD

Implementations described herein relate generally to a roller unit for feeding tapes, a fiber placement apparatus and a method of molding a composite material.

BACKGROUND

In order to mold an FRP (fiber reinforced plastic), such as a GFRP (glass fiber reinforced plastic) or a CFRP (carbon fiber reinforced plastic), which is also referred to as a composite material, it is necessary to laminate prepreg sheets consisting of fiber sheets impregnated with uncured resin, and subsequently cure the resin. Alternatively, it is necessary to laminate fiber sheets which have not been impregnated with resin, and subsequently impregnate the laminated fiber sheets with the resin and cure the resin. The method of molding an FRP of impregnating fibers with resin after laminating the fibers is referred to as an RTM (Resin Transfer Molding) method.

In recent years, an AFP (Automated Fiber Placement) apparatus for automatically laminating prepreg tapes or fiber tapes is commercially available (for example, refer to Japanese Patent Application Publication JP2014-519995A, International Publication WO2018/168202A and Japanese Patent Application Publication JP2019-151726A), and therefore a prepreg tape as well as a fiber tape, which has not been impregnated with resin, called a dry tape is also commercially available for lamination with an AFP apparatus.

When tape materials, such as prepreg tapes or dry tapes, are laminated with an AFP apparatus, laminating the tape materials simultaneously can improve the lamination efficiency, i.e., the length of the tape material laminated per unit time. Accordingly, an AFP apparatus having lamination heads is also devised so that tape materials can be laminated simultaneously (for example, refer to Japanese Patent Application Publication JP2011-527648A and Japanese Patent Application Publication JP2022-130133A). In addition, technique for adjusting an overlapped amount between adjacent prepreg tapes is also suggested for a multi-head type AFP apparatus for laminating prepreg tapes simultaneously (for example, refer to Japanese Patent Application Publication JP2020-059145A and Japanese Patent Application Publication JP2022-046379A).

However, the conventional AFP apparatus having lamination heads can laminate only tape materials each having a specific width. Therefore, in order to change the total width of laminated tape materials, the overlapped amounts among the tape materials have to be changed. In other words, the total width of laminated tape materials cannot be changed unless the tape materials are partially overlapped with each other. Accordingly, the thickness of laminated tape materials cannot be made uniform.

In addition, when prepreg tapes are overlapped with each other to be laminated, it may become difficult to laminate the prepreg tapes along a curved line since each prepreg tape has the viscosity. Specifically, when prepreg tapes are tried to be laminated along a curved line with overlapping the prepreg tapes with each other, the prepreg tapes may not be laid ideally since the length of a prepreg tape laminated on the inner side differs from that on the outer side. Accordingly, when prepreg tapes are overlapped with each other to be laminated, the prepreg tapes have to be laminated linearly or along a curved line whose curvature is very small.

This applies to a case where the width of the tape material itself is large. That is, in order to laminate tape materials along a curved line whose curvature is large, it is necessary to laminate tape materials whose widths are narrow without overlapping the tape materials with each other. The narrower the widths of tape materials are, the more the lamination efficiency of the tape materials decreases. Therefore, in order to avoid or reduce a decrease in the lamination efficiency, laminating more tape materials simultaneously is required.

However, a typical AFP apparatus has a lamination head composed of a brake for fixing a tape material, a feed roller for feeding out a tape material, a cutter for cutting a tape material, and a compaction roller for pushing a tape material on a mold. The widths of these components of the lamination head are each larger than the width of a tape material. Accordingly, lamination heads cannot be arrayed in the width direction of tape materials in order to avoid interference among the components. That is, lamination heads whose number is the same as that of tape materials have to be arranged at positions different from each other in the feeding direction of the tape materials like arranging the lamination heads alternately. As a result, feeding many tape materials simultaneously requires a large-scale AFP apparatus having many lamination heads, and therefore it is not easy to increase the number of tape materials.

Accordingly, an object of the present invention is to allow laminating tape materials, such as prepreg tapes or dry tapes, used as material of an FRP simultaneously without overlapping the tape materials with each other as well as to allow changing the total width of laminated tape materials.

Moreover, another object of the present invention is to allow laminating more tape materials by an AFP apparatus without a complicated and large-scale lamination head.

SUMMARY

In general, according to one implementation, a roller unit aligns tapes in a width direction and feeds the aligned tapes. The tapes are made of fibers which have not been impregnated with resin or have been impregnated with the resin. The roller unit includes rollers and a support shaft. The rollers rotate by friction force between the tapes and the rollers when the rollers contact with the tapes. The rollers are aligned so that rotation axes of the rollers lie on a same straight line. Diameters of the rollers are same as each other. The support shaft supports the rollers rotatably at rotational speeds independent from each other.

Further, according to one implementation, a fiber placement apparatus includes the above-mentioned roller unit.

Further, according to one implementation, a method of molding a composite material includes: laminating the tapes by feeding the tapes using the above-mentioned roller unit; and curing the resin with which the tapes have been impregnated.

DETAILED DESCRIPTION

A roller unit for feeding tapes, a fiber placement apparatus and a method of molding a composite material according to implementations of the present invention will be described with reference to accompanying drawings.

(Configuration and Functions of a Roller Unit for Feeding Tapes and a Fiber Placement Apparatus)

Figure 1:
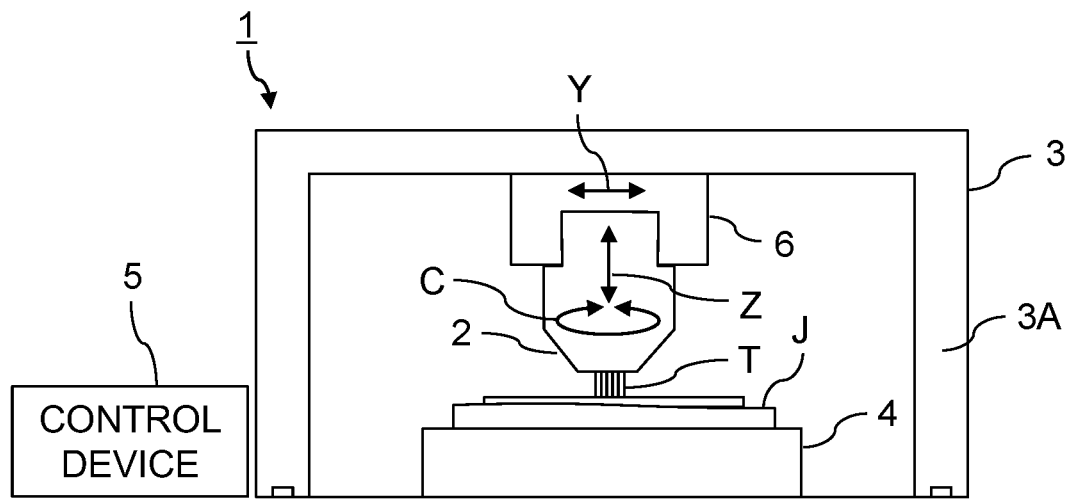
FIG. 1 is a front view showing overall schematic configuration of a fiber placement apparatus including a roller unit for feeding tapes according to an implementation of the present invention.
Figure 2:
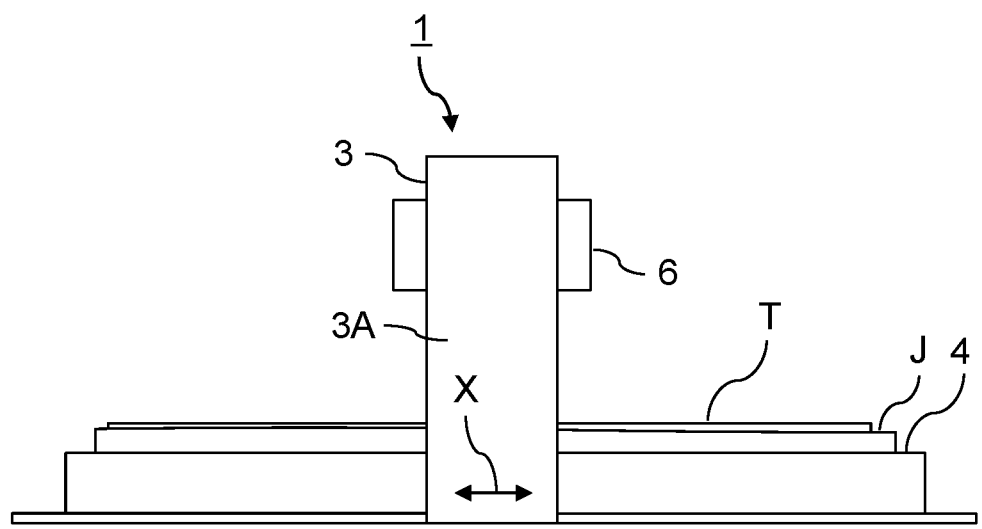
FIG. 2 is a side view of the fiber placement apparatus shown in FIG. 1.

FIG. 1 is a front view showing overall schematic configuration of a fiber placement apparatus 1 including a roller unit for feeding tapes according to an implementation of the present invention. FIG. 2 is a side view of the fiber placement apparatus 1 shown in FIG. 1.

The fiber placement apparatus 1 produces a laminated body of prepreg tapes T, which are material of a composite material consisting of an FRP, by laminating the prepreg tapes T. The prepreg is sheet like fibers impregnated with thermoplastic resin or uncured thermosetting resin. The fiber placement apparatus 1 is an automatic lamination apparatus of prepregs, which produces a laminated body of the prepregs using material consisting of the rolled prepreg tapes T.

The fiber placement apparatus 1 can be composed of a lamination head 2, a gantry 3 suspending the lamination head 2, a table 4, and a control device 5. The lamination head 2 houses the prepreg tapes T inside, and feeds out the prepreg tapes T on the table 4 by discharging the prepreg tapes T. In particular, the lamination head 2 has a function to dispose the prepreg tapes T in parallel while feeding out the prepreg tapes T on the table 4. For that purpose, the lamination head 2 has creel stands of the prepreg tapes T.

The table 4 is a pedestal for laminating the prepreg tapes T. Although the prepreg tapes T may be directly laminated on the table 4, it is practical to place a lamination jig J, such as a shaping mold, on the table 4 so that the prepreg tapes T may be laminated on the lamination jig J, from a viewpoint of shaping a laminated body of the prepregs and cleaning. Therefore, the prepreg tapes T can be laminated on the table 4 directly or indirectly through the lamination jig J.

The gantry 3 includes a feed structure 6 which moves the lamination head 2 in a desired axis direction, besides supporting structures, such as supporting columns 3A, for supporting the lamination head 2. The feed structure 6 makes the lamination head 2 perform a feeding operation. That is, the feed structure 6 moves the lamination head 2 relatively to the table 4 so that the prepreg tapes T can be fed out toward the table 4 side while changing a lamination position. A feeding direction of the prepreg tapes T toward the table 4 side is opposite to a moving direction of the lamination head 2.

The feed structure 6 is configured to rotate the lamination head 2, in addition to typical linear movement of the lamination head 2. Therefore, the prepreg tapes T can be fed out linearly or along a curved line. In other words, a feeding direction of the prepreg tapes T can be changed. Note that, a component attached to the lamination head 2 may be rotated instead of rotating a casing itself of the lamination head 2.

In the example shown in FIG. 1 and FIG. 2, the feed structure 6 has been configured not only to move the lamination head 2 in parallel along three axis directions orthogonal to each other, including horizontal directions and the vertical direction consisting of X-axis, Y-axis and Z-axis, but to rotate the lamination head 2 along a C-axis direction whose rotation axis is the Z-axis in the vertical direction. As a matter of course, at least one tilt axis for inclining the lamination head 2 relative to the surface of the table 4 may be added. Moreover, the table 4 may be moved to the lamination head 2 by the feed structure 6 in addition to the movement of the lamination head 2, or instead of the movement of the lamination head 2.

The moving structure for linearly moving the lamination head 2 and/or the table 4 can be composed of at least one motor, such as an electric motor, a hydraulic motor or a pneumatic motor, circuitry, such as electric circuitry, hydraulic circuitry or pneumatic circuitry, for rotating the at least one motor, and at least one desired machine element, such as wheels, a rack-and-pinion which is one kind of gears, at least one ball screw, or at least one crawler, for converting rotational movement of the at least one motor into linear movement, for example. Alternatively, a moving structure may also be composed of at least one piston and hydraulic circuitry without using any motor.

Meanwhile, the rotating structure for rotating the lamination head 2 can be composed of at least one motor, such as an electric motor, a hydraulic motor or a pneumatic motor, and desired machine elements including a rotating shaft which rotates by power of the at least one motor, for example.

The control device 5 automatically controls the feed structure 6 and the lamination head 2. For example, NC (numerical control) of a spatial position and a rotational moving amount of the lamination head 2 relatively to the table 4 can be performed by controlling the feed structure 6. Moreover, the feeding of the prepreg tapes T from the lamination head 2 can be automatically started and ended as well as the prepreg tapes T can be automatically cut, by controlling the lamination head 2. Although the control device 5 may be built in or attached to the gantry 3, user interfaces, such as operation boards, and heavy components may be placed outside the gantry 3.

When NC control of the lamination head 2 is performed by the control device 5, the control device 5 can be composed of electronic circuitry, such as a computer, into which NC program has been read. Moreover, when the feed structure 6 is a hydraulic system or a pneumatic system, a part of the control device 5 can be composed by hydraulic circuitry or pneumatic circuitry.

Figure 3:
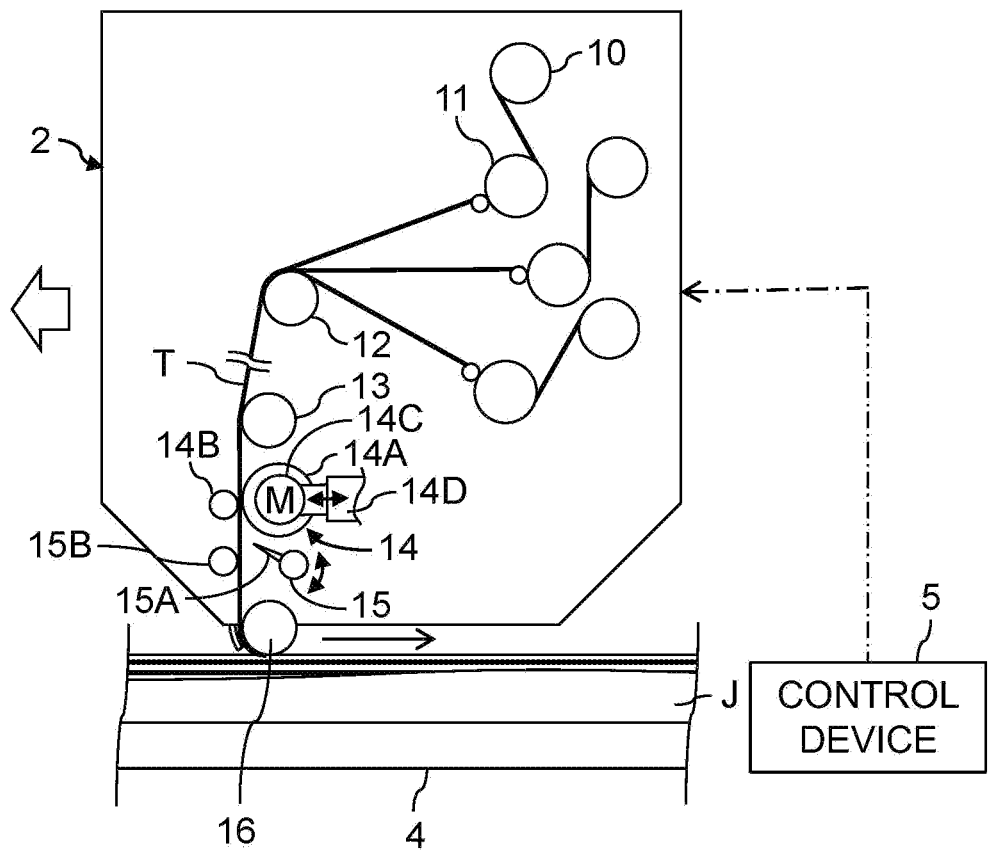
FIG. 3 is a side view showing an example of detailed structure inside and outside the laminating head shown in FIG. 1.

FIG. 3 is a side view showing an example of detailed structure inside and outside the lamination head 2 shown in FIG. 1.

As described above, the lamination head 2 has a function to align the prepreg tapes T in the width direction and feed out the aligned prepreg tapes T onto the table 4. For that purpose, the lamination head 2 can be provided with bobbins 10, width adjusting devices 11, an assembling roller 12, at least one tension roller 13, feed rollers 14, a cutter 15 and a compaction roller 16, as exemplified in FIG. 3.

Each of the bobbins 10 is a creel stand of the prepreg tape T having a constant width, and the prepreg tape T is wound on the bobbin 10. The bobbins 10 are provided as many as the number of the tapes T that can be fed out onto the table 4. The number of the tapes T to be fed out onto the table 4 may be decreased by resting or removing a part of the bobbins 10. The widths of the tapes T may be different from each other between the bobbins 10.

The width adjusting devices 11 are disposed in the rear stages of the bobbins 10 respectively, as required. Each of the width adjusting devices 11 changes the width of the tape T, supplied from the corresponding bobbin 10, to a desired width. For example, a device for narrowing the width of the tape T disclosed in Japanese Patent Application Publication JP2020-93454A may be used as the width adjusting device 11. Disposing the width adjusting device 11 makes it possible to supply the tape T, supplied from the corresponding bobbin 10, with changing the width of the tape T to a desired width. Conversely, when the width adjusting device 11 is not disposed, the tapes T having widths different from each other can also be supplied by replacing the bobbin 10 with another bobbin 10 corresponding to a different width of the tape T.

The width of the prepreg tape T for an aircraft is standardized in units of inches in many cases. It was confirmed by preform prototype tests that it was desirable to make each of the widths of the tapes T not more than ¼ inch (6.35 mm) from the viewpoint of securing the quality of a preform produced as a laminated body of the prepreg tapes T when steering lamination was performed in which the lamination head 2 was rotated to feed the prepreg tapes T onto the table 4 along a curved line, as described above. Accordingly, the bobbin 10 of the prepreg tape T having a width of ¼ inch or the bobbin 10 of the prepreg tape T having a width of ⅛ inch can be set regardless of whether the width adjusting device 11 is provided.

On the other hand, a standard prepreg tape T on the market has a thickness of 0.2 mm to 0.8 mm. A prepreg tape T having a thickness of 0.05 mm was used for preform prototype tests. Technically, it is considered possible to manufacture a thin prepreg tape T having a thickness of about 0.025 mm.

Each of the bobbin 10 and the width adjusting device 11 is provided with frames or wall surfaces for preventing the tape T from falling off. Accordingly, the widths of the bobbin 10 and the width adjusting device 11 are each wider than the width of the tape T. Therefore, in order to dispose the tapes T side by side without gaps, it is necessary to dispose the units, composed of the bobbins 10 and the width adjusting devices 11, for supplying each adjacent two tapes T, at different positions in the thickness directions of the tapes T as shown in FIG. 3 so that the interference between the units, composed of the bobbins 10 and the width adjusting devices 11, for supplying each adjacent two tapes T can be prevented. When the number of the tapes T is large, the units each composed of the bobbin 10 and the width adjusting device 11 may be disposed alternately. Alternatively, the prepreg tapes T may be twisted, and the units each composed of the bobbin 10 and the width adjusting device 11 may be disposed at positions where no interference arises.

The assembling roller 12 is a cylindrical roller for disposing and feeding the tapes T, fed out from positions different in the thickness directions of the tapes T, at a same position in the thickness directions of the tapes T. In other words, the assembling roller 12 is a cylindrical roller for arraying the tapes T, fed out in different directions, so that the length directions of the tapes T may become almost parallel to each other, and feeding out the arrayed tapes T in a same feeding direction.

When the width adjusting devices 11 are disposed in the fore stage of the assembling roller 12, the tapes T having different widths may be fed out to the assembling roller 12. Accordingly, when the interval between the central positions of each two tapes T adjacent in the width direction is made constant, the width of the gap between the edges of each two tapes T adjacent in the width direction may change. Therefore, the tape feeders disclosed in the application documents of Japanese Patent Application No. 2022-007499 may be disposed in the fore stage of the assembling roller 12 so that the interval between the central positions of each adjacent two tapes T can be adjusted according to the widths of the tapes T fed out from the width adjusting devices 11.

Each tension roller 13 is a cylindrical roller for preventing slack of the tapes T fed out in the same direction from the assembling roller 12 by applying tension to the tapes T. Tension can be applied to the tapes T by contacting the tension roller 13 with the tapes T so that the advancing direction of the tapes T may be changed.

The feed rollers 14 have power for feeding the tapes T, fed out in a same direction, in the length direction of the tapes T. The feed rollers 14 can be composed of a cylindrical power roller 14A, which is powered, and a cylindrical support roller 14B, which is not powered. The rotating shaft of the power roller 14A is coupled to the output shaft of a motor 14C. Accordingly, the power roller 14A is rotated by the power of the motor 14C. The support roller 14B is a roller for sandwiching the tapes T between the support roller 14B and the power roller 14A.

As a matter of course, both of the two rollers that sandwich the tapes T may be rotated by at least one motor. Gears and/or a one-way clutch may be coupled between the rotating shaft of the power roller 14A and the output shaft of the motor 14C.

The motor 14C for driving the feed rollers 14 can be controlled by the control device 5. Therefore, the start and end of feeding of the tapes T can be controlled by controlling the start and stop of rotation of the motor 14C.

The cutter 15 is a tool for cutting the tapes T when the tapes T fed out in a same direction have been laminated. The operation of the cutter 15 can be controlled by the control device 5.

Although the cutter 15 in the example shown in FIG. 3 is a rotary type in which the cutter 15 is rotated in order to contact a blade 15A of the cutter 15 with the tapes T, the cutter 15 may be moved in parallel in order to contact the blade 15A of the cutter 15 with the tapes T. Moreover, a cylindrical roller 15B may be disposed for sandwiching the tapes T between the roller 15B and the blade 15A of the cutter 15.

The compaction roller 16 is a cylindrical roller for feeding out the tapes T, fed out in a same direction, toward the table 4 while applying pressure to the tapes T in the thickness direction of the tapes T. The tapes T in the first ply are pressed on the lamination jig J by the compaction roller 16 while the tapes T in the second and subsequent plies are pressed on the lower laminated tapes T adjacent in the thickness direction. Therefore, the compaction roller 16 is a roller that feeds out the tapes T arrayed in the width direction while pressing the arrayed tapes T to the lamination jig J or the tapes T adjacent in the thickness direction.

As the number of the laminated tapes T increases, the height of the tapes T to be newly laminated gradually increases. Therefore, it is necessary to move the compaction roller 16 also in the vertical direction. The vertical position of the compaction roller 16 can be adjusted by moving the lamination head 2 vertically in parallel with the feed structure 6. Alternatively, a drive shaft may be provided for moving the compaction roller 16 up and down relatively to the lamination head 2.

Moving the compaction roller 16 so that the tapes T fed out in a same direction may be moved in a horizontal direction relatively to the table 4 allows feeding out the tapes T in a direction opposite to a moving direction of the compaction roller 16. In order to feed out the tapes T in a horizontal direction, it is necessary to dispose the compaction roller 16 so that the rotation axis of the compaction roller 16 may be horizontal. On the other hand, other rollers including the assembling roller 12 may each have a rotation axis inclined with respect to the horizontal direction in order to avoid interference or the like since the tapes T can be twisted.

After the ends of the tapes T reach the compaction roller 16, the tapes T can be fed out by the pressure applied from the compaction roller 16 without applying tension to the tapes T by the powered feed rollers 14. Then, the feeding speeds of the tapes T necessarily become the speeds of the tapes T fed out from the compaction roller 16 respectively. Therefore, after the ends of the tapes T reach the compaction roller 16, it is not preferable to apply excessive tension to the tapes T by the feed rollers 14 since the excessive tension by the feed rollers 14 causes slack or stretch of the tapes T.

Thus, the power roller 14A of the feed rollers 14 may be coupled to a cylinder mechanism 14D exemplified in FIG. 3 or another reciprocating mechanical element, such as a rack-and-pinion or a ball screw. Thereby, the power roller 14A can be retracted from the tapes T after the ends of the tapes T reach the compaction roller 16. Alternatively, the feed rollers 14 may be brought into contact with the tapes T in order to secure the tension of each tape T appropriately. In this case, each tape T is slid on the feed rollers 14.

Note that, a belt conveyor or a belt conveyor with a suction chuck disclosed in the application documents of Japanese Patent Application No. 2022-013771 may be used instead of the feed rollers 14 or in addition to the feed rollers 14.

When the compaction roller 16 is rotated together with the lamination head 2 relatively to the table 4 around the vertical rotation axis in order to feed out the prepreg tapes T, disposed in parallel in the width direction, from the compaction roller 16 onto the table 4 along a curved line, it is necessary to change the feeding speeds between the tapes T disposed in parallel in the width direction. As a result of the tests, it was found that the overlap of the prepreg tapes T, disposed in parallel in the width direction, with each other made it difficult to greatly change the feeding speeds between the tapes T due to the tack of the prepregs.

Therefore, in order to move the lamination head 2 along a curved trajectory having a curvature as large as possible, it is essential not only to use the tape T of not more than ¼ inch as described above, but also to prevent the tapes T to be fed out simultaneously from overlapping with each other in the width direction.

Note that, when the tapes T may be laminated with gaps thereamong, i.e., when the width of a lamination area is wider than the total width of the tapes T, the tapes T may be fed out from the compaction roller 16 with gaps thereamong. Hereinafter, a case of feeding out the tapes T from the compaction roller 16 without gaps and overlaps except for negligible gaps and overlaps will be described as an example.

When the tapes T arrayed in parallel without being overlapped with each other in the width direction are fed out from the compaction rollers 16 at different feeding speeds respectively, not only the tapes T to be fed out by the compaction roller 16 but also the tapes T to be fed out by each roller other than the compaction roller 16 are required to be fed out at feeding speeds different among the tapes T. That is, it is necessary to feed out the tapes T at feeding speeds independent from each other.

Thus, a roller unit allowing the tapes T to be fed out at independent feeding speeds respectively is used as each roller on which non-negligible frictional force is generated due to simultaneous and continuous contact with the tapes T also after the ends of the tapes T disposed in parallel without being overlapped with each other in the width direction reach the compaction roller 16 if the roller was a normal roller.

In the example shown in FIG. 3, at least the assembling roller 12, each tension roller 13 and the compaction roller 16 can each consist of the roller unit allowing the tapes T to be fed out at independent feeding speeds respectively. In addition, each of the cylindrical roller 15B, facing the blade 15A of the cutter 15, and the support roller 14B of the feed rollers 14 may also consist of the roller unit allowing the tapes T to be fed out at independent feeding speeds respectively as long as non-negligible frictional force is generated between the roller and the tapes T if the roller was a normal roller.

Figure 4:
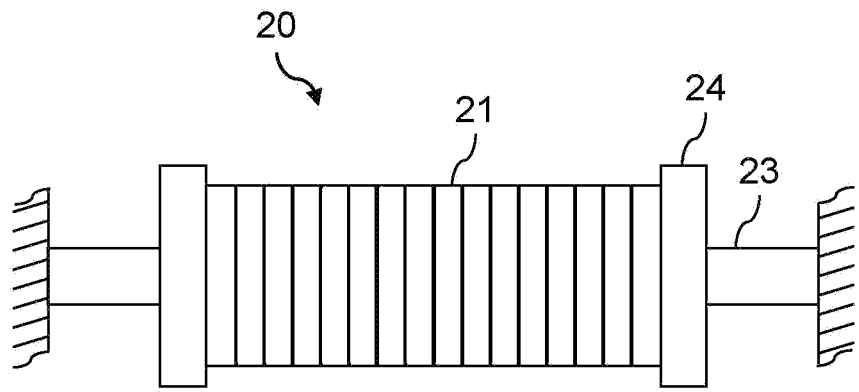
FIG. 4 is a front view showing structure of a roller unit for feeding tapes.
Figure 5:
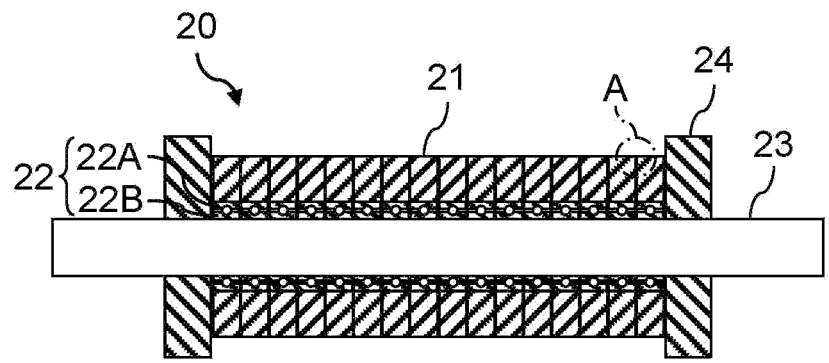
FIG. 5 is a longitudinal sectional view of the roller unit shown in FIG. 4.

FIG. 4 is a front view showing structure of a roller unit 20 for feeding tapes. FIG. 5 is a longitudinal sectional view of the roller unit 20 shown in FIG. 4.

The roller unit 20 for tape feeding can feed out the tapes T whose widths may be changed, at feeding speeds independent from each other in a state in which the tapes T are disposed without being overlapped with each other in the width direction. The roller unit 20 having such a function is a cylindrical roller composed of a plurality of sub rollers 21, a support shaft 23 and bearings 22. The sub rollers 21 are supported by the support shaft 23 through the bearings 22 respectively.

The sub rollers 21 have a same diameter and are disposed side by side so that the rotation axes of the sub rollers 21 may be on a same straight line. The inner surface of each sub roller 21 is fixed to an outer ring 22A of the corresponding bearing 22. That is, each sub roller 21 is supported by the bearing 22. Therefore, each sub roller 21 is rotated by the frictional force between the sub roller 21 and the tapes T. That is, no motor for directly giving torque to the sub rollers 21 is provided.

The support shaft 23 is a common shaft for supporting the sub rollers 21 rotatably at independent rotating speeds. The support shaft 23 itself is fixed not so as to rotate. An inner ring 22B of each bearing 22 is fixed to the support shaft 23. Thereby, each of the sub rollers 21 can be rotatably supported by the support shaft 23. In addition, ring detachment prevention plates 24 can be fixed to the support shaft 23 on both sides of the sub rollers 21.

Although it is also possible to rotatably support the cylindrical sub rollers 21 directly by the support shaft 23 without the bearings 22, in that case, the sub rollers 21 are rotated only by the frictional force between the tapes T and the sub rollers 21. Therefore, it is realistic to support the sub rollers 21 with the bearings 22 respectively from the viewpoint of avoiding insufficient lubrication between the sub rollers 21 and the support shaft 23.

It can also be said that the roller unit 20 configured in this way is a composite roller in which a plurality of rings are rotatably disposed to form a cylindrical shape. The outer surfaces of the sub-rollers 21 consisting of the rings may come into contact with the tapes T of which widths and the number are not always constant.

Therefore, the shape of each outer surface of the sub rollers 21 is determined to be flat on any longitudinal section of the roller unit 20 so that each tape T may not wrinkle unfavorably. For that purpose, what is necessary is just to form the shape of each outer surface of the sub rollers 21 as a cylindrical side surface without chamfering. In addition, all the sub rollers 21 are disposed so that no gap may be formed between any adjacent two outer surfaces of the sub rollers 21. That is, the shapes and arrangement of the sub rollers 21 are determined so that the shape derived by connecting the contours of the outer surfaces of all the sub rollers 21 with each other may become two parallel straight lines on any longitudinal section of the roller unit 20. Each sub roller 21 is made of a rigid body, such as a metal or a resin, so that the outer surface of the sub roller 21 may not be easily deformed.

In this case, each tape T can be brought into line contact with at least a part of the sub rollers 21 on a longitudinal section including the rotation axis of the roller unit 20 and the sub rollers 21 so as to be slidable in the direction of the rotation axis of the sub rollers 21. That is, each tape T can be slid on the sub rollers 21 in the rotation axis direction of the sub rollers 21.

The thickness of each sub roller 21 is determined to be thinner than any width of the tape T that may be supplied. In other words, the thickness of each sub roller 21 is determined so that each supplied tape T may always come into contact with at least two of the sub rollers 21 no matter what width each supplied tape T has. As a specific example, when the thickness of each sub roller 21 is 3 mm, each tape T can certainly be brought into contact with at least two of the sub rollers 21 whether the tapes T each having a width of ¼ inch (6.35 mm) are supplied or the tapes T each having a width of ⅛ inch (3.175 mm) are supplied.

When the thickness of each sub-roller 21 is made thinner than the width of the tape T, each tape T comes into contact with at least two of the sub rollers 21. In this case, each sub roller 21 rotates at a rotation speed determined by the frictional force between the roller 21 and the main tape T while sliding on another tape T in contact with the roller 21. Therefore, each sub roller 21 can be rotated at an independent rotating speed according to a feeding speed of the corresponding tape T. Conversely, the tapes T can be fed out at feeding speeds independent from each other using the sub rollers 21 rotatable at rotating speeds independent from each other.

That is, so long as each of the tapes T has a width wider than any of the thicknesses of the sub rollers 21, the tapes T can be fed out at independent feeding speeds by rotating at least two of the sub rollers 21 while being brought into line contact with at least three of the sub rollers 21, on a longitudinal section of the sub rollers 21 including the rotation axis of the sub rollers 21, slidably in the direction of the rotation axis of the sub rollers 21.

In case of the assembling roller 12 shown in FIG. 3, the tapes T come into contact with the assembling roller 12 at positions different in the circumferential direction of the assembling roller 12 while the tapes *T separate* from the assembling roller 12 at a same position in the circumferential direction of the assembling roller 12. Accordingly, when the roller unit 20 is the assembling roller 12, all the tapes T come into line contact with at least three of the sub rollers 21, on at least one longitudinal section of the sub rollers 21, slidably in the rotation axis direction of the sub rollers 21.

Decreasing the thickness of each sub roller 21 allows feeding out even the tapes T having narrower widths. Meanwhile, the thickness of each sub roller 21 must be not less than the thickness of the bearing 22. Therefore, determining the thickness of each sub roller 21 according to the thickness of the bearing 22, which is easily available, leads to the simplification of producing of the roller unit 20. From the viewpoint of securing the rigidity of each sub roller 21, it is considered realistic to make the thickness of each sub roller 21 not less than 1 mm.

The diameter of each sub roller 21 can be determined according to the thickness of the tape T and the devices disposed before and after the roller unit 20. Specifically, the thicker the prepreg tape T is, the more difficult it becomes to bend the tape T in the thickness direction, and therefore the more it becomes necessary to increase the diameter of each sub roller 21. For example, the prepreg tape T having a thickness of 0.05 mm can be sufficiently curved even with the sub rollers 21 each having a diameter of 20 mm.

Figure 6:
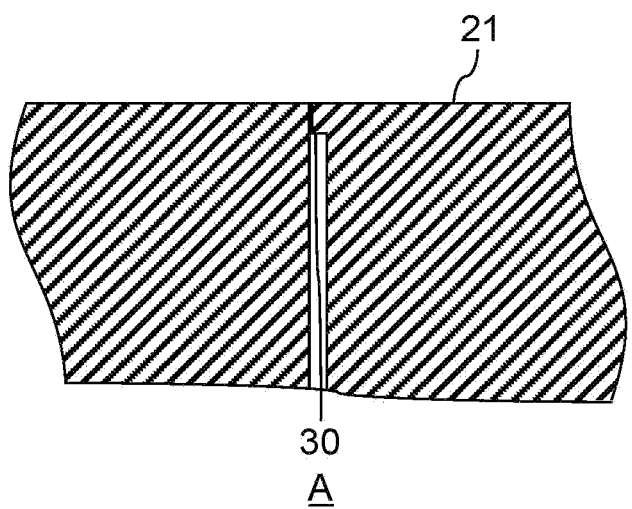
FIG. 6 is an enlarged view at the position A of the sub rollers shown in FIG. 5.

FIG. 6 is an enlarged view at the position A of the sub rollers 21 shown in FIG. 5.

When the end faces of adjacent sub rollers 21 come into contact with each other, undesirable frictional force is generated. Accordingly, a step 30 can be formed in each sub roller 21 so that the area of one end face of each sub roller 21, which may come into contact with the end face of the adjacent sub roller 21, may be reduced, as exemplified in FIG. 6. More specifically, the radial step 30 can be formed in each of the sub rollers 21 so that the thickness of each sub roller 21 may decrease toward the bearing 22 while keeping the shape of the outer surface of each sub roller 21 from changing, as exemplified in FIG. 6.

In this case, an annular end face having a narrow width is formed in each sub roller 21, and thereby the contact area between the end faces of each adjacent sub rollers 21 can be reduced. As a result, it is possible to reduce generation of useless frictional force due to rotation of the sub rollers 21 disposed without gaps at independent rotation speeds.

If the height difference of the step 30 is increased, the thickness of the sub roller 21 is decreased, which causes reduction in rigidity. Therefore, the height of each step 30 is preferably made the minimum height that can avoid the generation of non-negligible frictional force. The closer each step 30 is made to the outer surface of the sub roller 21, the narrower the width of the annular end face of each sub roller 21 becomes, and the greater the effect of reducing the frictional force becomes. Accordingly, for example, the height of each step 30 can be made about 0.1 mm while the width of each annular end face can be made about 0.2 mm.

As long as the step 30 is formed on one of the two end faces of each adjacent sub rollers 21, the contact area between the end faces is reduced. Therefore, it is not necessary to form the step 30 on both of the two end faces that may come into contact with each other. That is, the effect of reducing the frictional force between each adjacent sub rollers 21 can be obtained by forming the step 30 only on one end face of each sub roller 21 except for one of the two sub rollers 21 at both ends adjacent to the ring detachment prevention plates 24. Meanwhile, it is desirable to form the step 30 also in each of the sub rollers 21 adjacent to the ring detachment prevention plates 24 in order to reduce the frictional force between the ring detachment prevention plate 24 and the sub roller 21, except for a case where a gap is generated between the ring detachment prevention plate 24 and the sub roller 21 due to the placement of an O-ring or the like.

Figure 7:
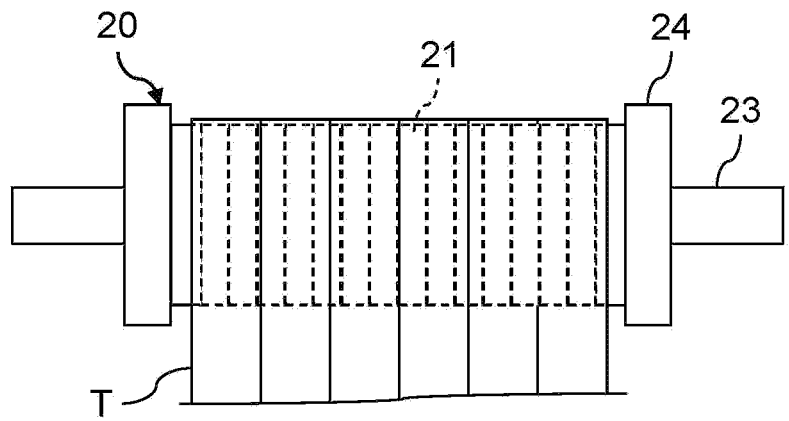
FIG. 7 shows an example of feeding out wide prepreg tapes by the roller unit shown in FIG. 4.
Figure 8:
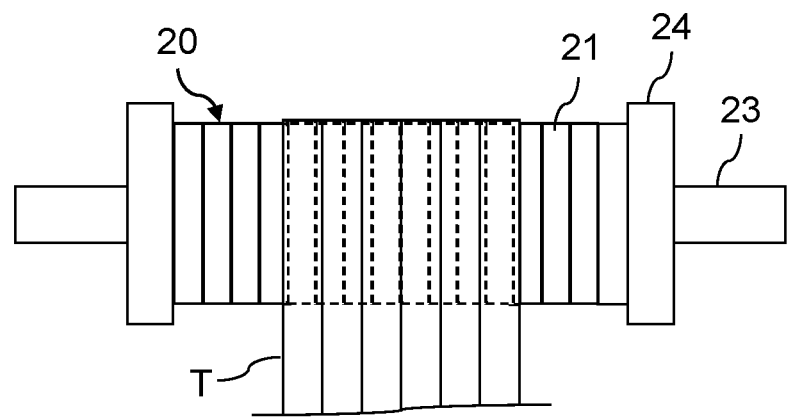
FIG. 8 shows an example of feeding out narrow prepreg tapes by the roller unit shown in FIG. 4.
Figure 9:
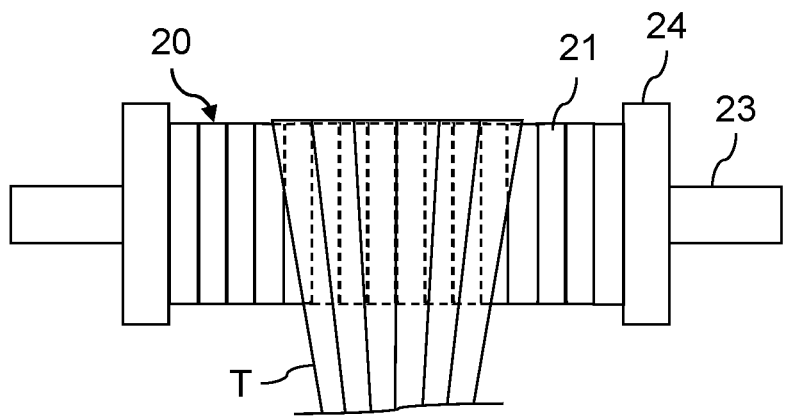
FIG. 9 shows an example of feeding out prepreg tapes, each having a varying width, by the roller unit shown in FIG. 4.

FIG. 7 shows an example of feeding out wide prepreg tapes T by the roller unit 20 shown in FIG. 4. FIG. 8 shows an example of feeding out narrow prepreg tapes T by the roller unit 20 shown in FIG. 4. FIG. 9 shows an example of feeding out prepreg tapes T, each having a varying width, by the roller unit 20 shown in FIG. 4.

As described above, the tapes T, having different widths, disposed in parallel in the width direction can be fed out from the roller unit 20. Accordingly, when the wide tapes T are supplied to the roller unit 20, the tapes T having a wide total width can be fed out as exemplified in FIG. 7. Conversely, when the narrow tapes T are supplied to the roller unit 20, the tapes T having a narrow total width can be fed out as exemplified in FIG. 8. Alternatively, when the tapes T are supplied to the roller unit 20 while varying the widths by the width adjusting devices 11 respectively, the tapes T having a varying total width can be fed out as exemplified in FIG. 9.

Figure 10:
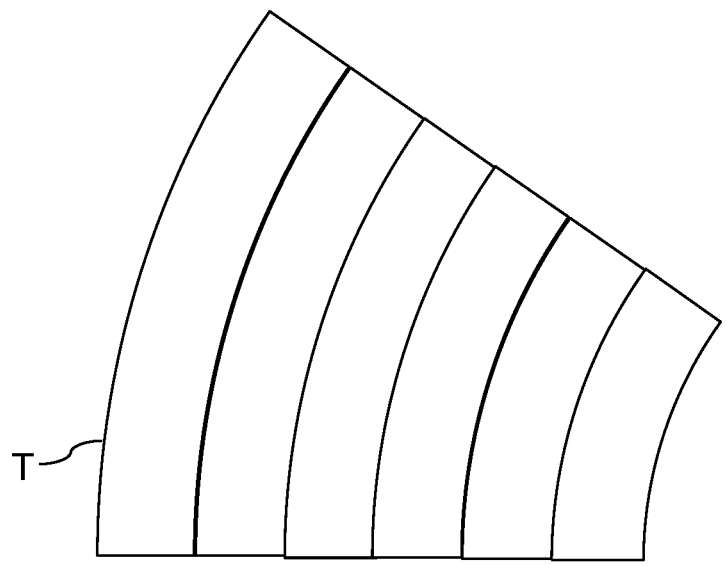
FIG. 10 shows an example of prepreg tapes that can be laminated by the fiber placement apparatus having the roller unit shown in FIG. 4.
Figure 11:
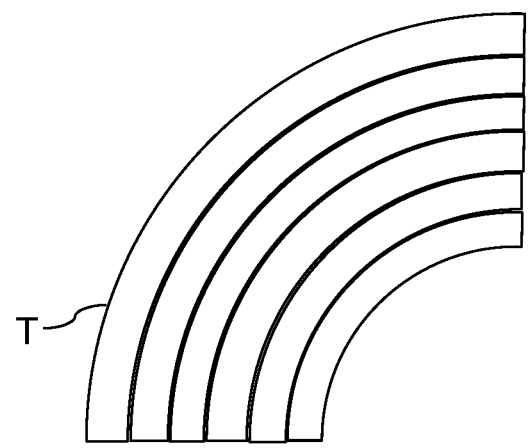
FIG. 11 shows another example of prepreg tapes that can be laminated by the fiber placement apparatus having the roller unit shown in FIG. 4.

FIG. 10 shows an example of prepreg tapes T that can be laminated by the fiber placement apparatus 1 having the roller unit 20 shown in FIG. 4. FIG. 11 shows another example of prepreg tapes T that can be laminated by the fiber placement apparatus 1 having the roller unit 20 shown in FIG. 4.

When the lamination head 2 is horizontally moved relatively to the table 4 while rotating the lamination head 2 around a vertical rotation axis, the tapes T arrayed in the width direction can be fed out and laminated along a curved line as exemplified in FIG. 10. When the tapes T are laminated along a curved line, the lengths of the tapes T fed out per unit time are different from each other as exemplified in FIG. 10. In this case, the tapes T can be fed out at independent feeding speeds as long as the tapes T are fed out by the roller unit 20. Therefore, it is possible to prevent a problem that a part of the tapes T is displaced and overlaps.

When the narrow tapes T are fed out, the tapes T can be laminated along a curved line, having a larger curvature, as exemplified in FIG. 11. Conversely, when the wide tapes T are used as exemplified in FIG. 10, the lamination area of the tapes T per unit time can be increased. Therefore, the tapes T having appropriate widths can be used according to a shape of an FRP to be molded.

(A Method of Molding a Composite Material)

Next, a method of molding a composite material, consisting of an FRP, using the fiber placement apparatus 1 having the roller units 20 for tape feeding will be described.

In order to mold an FRP, a preform having a shape corresponding to a shape of the FRP after molding is first produced by laminating and shaping prepreg tapes T. For that purpose, the lamination jig J, having a simple shape, for laminating the prepreg tapes T as well as a shaping jig, having a complicated shape, for shaping a laminated body of the prepreg tapes T may be prepared separately. In this case, the laminated body of the prepreg tapes T laminated on the lamination jig J is transferred on the shaping jig and then shaped. Alternatively, the lamination jig J itself may be also used as the shaping jig.

The operation of laminating the prepreg tapes T on the lamination jig J is performed by the fiber placement apparatus 1 having the roller units 20 for tape feeding exemplified in FIG. 1 to FIG. 6. For that purpose, a control program for the fiber placement apparatus 1 for automatically laminating the prepreg tapes T is read into the control device 5. Meanwhile, the bobbins 10 wound with the prepreg tapes T having widths used for the lamination are set on the lamination head 2. At this time, the respective end portions of the tapes T are sandwiched between the power roller 14A and the support roller 14B included in the feed rollers 14.

When the fiber placement apparatus 1 is operated under the control of the control device 5, the motor 14C for the feed rollers 14 is driven and thereby the power roller 14A is rotated. As a result, the end portions of the tapes T are fed out at a same feeding speed. That is, the tapes T passing through the width adjusting devices 11, the assembling roller 12 and the at least one tension roller 13 from the bobbins 10 are fed out at a same feeding speed.

When the end portions of the tapes T reach the surface of the lamination jig J, the feed structure 6 is driven under the integrated control by the control device 5, and thereby the lamination head 2 is moved in the direction opposite to a feeding direction of the tapes T. As a result, the compaction roller 16 is moved relatively to the lamination jig J in the direction opposite to the feeding direction of the tapes T, and eventually the end portions of the tapes T are sandwiched between the compaction roller 16 and the lamination jig J. That is, the end portions of the tapes T reach the compaction roller 16.

Then, the cylinder mechanism 14D is driven under the integrated control by the control device 5, and thereby the power roller 14A is retracted from the tapes T. Accordingly, when the lamination head 2 is continuously moved in the direction opposite to the feeding direction of the tapes T, the tapes T are fed in the feeding direction. The feeding speed of the tapes T becomes a speed of the tapes T being fed out while receiving pressure from the compaction roller 16, i.e., a relative speed of the table 4 and the lamination jig J to the compaction roller 16 and the lamination head 2.

After that, prepregs in the first ply can be laminated on the lamination jig J by moving the lamination head 2 along paths defined by the control program. When the tapes T are linearly fed out by moving the lamination head 2 linearly, the feeding speeds of the tapes T are the same as each other. On the other hand, when the tapes T are fed out along a curved line as exemplified in FIG. 10 and FIG. 11, the feeding speeds of the tapes T are not the same as each other.

Each of the rollers, including the assembling roller 12 and the at least one tension roller 13, used for feeding out the tapes T consists of the roller unit 20, as exemplified in FIG. 4 to FIG. 6, which allows the tapes T to be fed out at independent feeding speeds. Accordingly, even when a path of the lamination head 2 is a curved line having a small curvature as well as a curved line having a large curvature, the tapes T can be laminated along a target path without misalignment of the tapes T, as exemplified in FIG. 10 and FIG. 11.

In addition, each of the roller units 20, including the assembling roller 12 and the at least one tension roller 13, used for feeding out the tapes T can feed out the tapes T while sliding the tapes T in the width direction. Accordingly, the width adjusting devices 11 can be controlled by the control device 5 according to prepreg lamination conditions, and the tapes T can be fed out by the roller units 20 while continuously changing the widths of the tapes T by the width adjusting devices 11 as exemplified in FIG. 9.

Moreover, the width adjusting devices 11 may also be controlled by the control device 5 so that the widths of the tapes T fed out by the roller units 20 may be intermittently changed by the width adjusting devices 11 according to lamination conditions, such as a rotation radius of the lamination head 2 and widths of prepregs after lamination, as exemplified in FIG. 7 and FIG. 8. In other words, it is possible to define various conditions for laminating the tapes T in the control program.

When the lamination head 2 reaches a lamination end position in the first ply, the cutter 15 is driven under the integrated control by the control device 5, and thereby the tapes T are cut. Subsequently, the feed structure 6 is driven under the integrated control by the control device 5, and thereby the lamination head 2 is moved to a lamination start position in the second ply. Then, lamination of the tapes T in the second ply can be started similarly to that in the first ply. Thus, when lamination of all the plies is completed, a laminated body of prepregs is produced. Note that, when a certain ply is divided into a plurality of lamination areas and/or when the widths of the tapes T are varied discontinuously, cutting of the tapes T and resuming of lamination can be performed during lamination of a same ply.

When an FRP to be produced has a complicated shape like an aircraft part having a curved web and flange, it may be necessary to give the laminated body of the prepregs, placed on the lamination jig J, a shape corresponding to the shape of the FRP. In such a case, following the prepreg lamination process, a shaping process is performed to give the shape to the laminated body of the prepregs.

The laminated body of the prepregs can be shaped by heating with a heating device and pressurization. The pressurization can be performed by pressing a shaping mold to the laminated body of the prepregs with a pressing machine or applying atmospheric pressure to the laminated body of the prepregs by bagging. When the lamination jig J does not serve as a shaping mold, as described above, the laminated body of the prepregs is transferred from the lamination jig J on a shaping mold. Conversely, when the lamination jig J also serves as a shaping mold, the lamination jig J on which the laminated body of the prepregs is placed is transported to an area for carrying out the shaping process by bagging, a pressing machine, or the like.

When the shaping of the laminated body of the prepregs is completed, a preform having a shape corresponding to the shape of the FRP after molding is produced. Note that, in a case where the FRP has a simple shape like an aircraft panel, and therefore the preform can be produced only by laminating the prepreg tapes T on the lamination jig J having a shape for the shaping, the lamination and the shaping of the prepregs are performed at the same time.

Once the preform is produced, the resin included in the preform is cured. That is, a curing process of the resin with which the laminated and shaped prepreg tapes T is previously impregnated is performed. Thereby, the FRP having a target shape can be molded.

When the resin is a thermosetting resin, the curing process of the resin is performed by heating the resin using a heating device, such as an oven or an autoclave apparatus. On the other hand, when the resin is a thermoplastic resin, the curing process of the resin is performed by heating and melting the resin once with a heating device, and then cooling the resin by air cooling or the like. In addition, an assembly process for combining the preform with at least one other preform and/or at least one other intermediately cured FRP as well as placing at least one other dry preform to be molded by the RTM method on the preform, and subsequent injection of resin into the at least one dry preform may also be performed prior to curing the resin.

The lamination jig J or the shaping jig may be used as a molding jig for molding the FRP by curing the resin included in the preform. Alternatively, a molding jig may be prepared separately, and the preform may be transferred from the lamination jig J or the shaping jig to the molding jig.

(Effects)

As described above, in the roller unit 20 for tape feeding, the fiber placement apparatus 1, and the method of molding a composite material, prepreg tapes T disposed in parallel so as not to overlap with each other in the width direction are laminated by being fed out by the sub rollers 21, having a same diameter, rotatably supported by the support shaft 23.

Thus, according to the roller unit 20 for tape feeding, the fiber placement apparatus 1, and the method of molding a composite material, a plurality of prepreg tapes T can be laminated simultaneously without overlapping with each other. In addition, the total width of the tapes T to be laminated can be changed by feeding out prepreg tapes T having different widths and/or changing the number of prepreg tapes T to be fed out.

Figure 12:
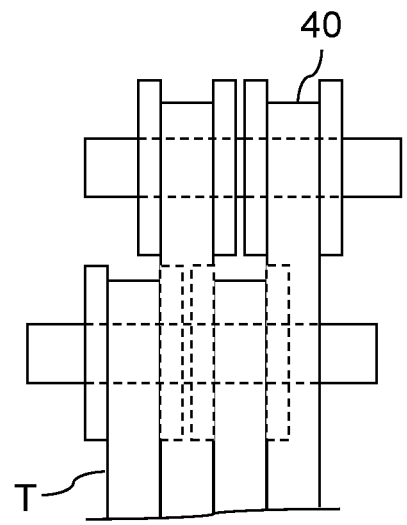
FIG. 12 is a view for explaining a problem in a conventional AFP apparatus that feeds out prepreg tapes using separate type rollers disposed alternately.

FIG. 12 is a view for explaining a problem in a conventional AFP apparatus that feeds out prepreg tapes T using separate type rollers 40 disposed alternately.

When the prepreg tapes T are fed out with the separate type rollers 40 disposed alternately as shown in FIG. 12, it is not easy to change the width of each tape T although each tape T can be fed out at an independent feed speed. In addition, if tapes T with narrow widths are to be fed out, gaps arise among the tapes T. In order to eliminate the gaps among the tapes T, it is required to prepare complicated mechanisms for respectively moving the separate type rollers 40 in the rotation axis direction.

For this reason, in order to increase the number of the tapes T, it is necessary to increase not only the number of the separate type rollers 40 but also the number of the complicated mechanisms for respectively moving the separate type rollers 40 in the rotation axis direction, which causes a problem that the number of the tapes T cannot be increased unless the lamination head is made very large.

On the other hand, when the above-mentioned roller unit 20 is used, each tape T can slide on the sub rollers 21 in the width direction of the tape T. Therefore, gaps between the tapes T can be eliminated or adjusted without complicated mechanisms even when the tapes T to be fed out have different widths. In addition, the number of the tapes T that can be fed out can be easily increased only by increasing the number of the sub rollers 21. That is, it becomes possible to laminate more tapes T simultaneously using a substantially single cylindrical roller without making the lamination head 2 complicated and large-scale.

Figure 13:
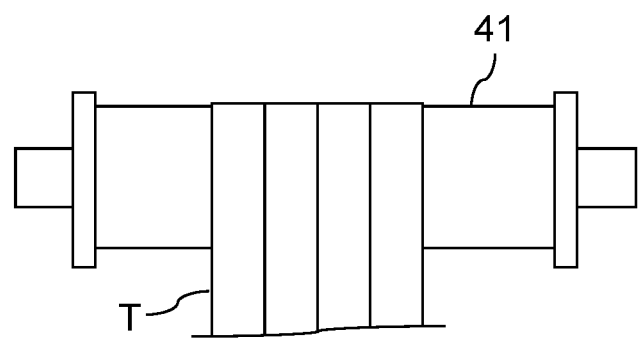
FIG. 13 is a view for explaining a problem in a conventional AFP apparatus that feeds out prepreg tapes using a common single roller.

FIG. 13 is a view for explaining a problem in a conventional AFP apparatus that feeds out prepreg tapes T using a common single roller 41.

When the prepreg tapes T are fed out by the common single roller 41, as shown in FIG. 13, each tape T cannot be fed out at an independent feeding speed. As a result, there is a problem that the tapes T may be laminated in a state of being shifted and overlapped when it is attempted to laminate the tapes T along a curved line with a large curvature.

Note that, tests were conducted with coating the surface of the single roller 41 to reduce the friction between the single roller 41 and the tapes T. As a result, it became clear that each tape T might not be fed out at an independent feeding speed due to insufficient reduction effect of the friction force.

On the other hand, when the above-mentioned roller unit 20 is used, each tape T can be fed out at an independent feeding speed since each sub roller 21 can rotate at an independent rotational speed. As a result, it becomes possible to laminate the tapes T easily along a curved line as exemplified in FIG. 10 and FIG. 11 using a substantially single cylindrical roller regardless of whether the curved line has a large curvature or a small curvature. That is, it is possible to avoid a situation in which an excess tape T on the inner ring side has no place to go and thereby deviates from a pathway, which allows steering lamination of the tapes T with stable quality and accuracy.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, although a case where each tape T to be laminated is a tape-shaped prepreg, which is fibers impregnated with resin, has been described in the above-mentioned implementation, each tape T may be tape-shaped fibers, which have not been impregnated with resin. A tape T made of fibers before being impregnated with resin is called a dry tape. A laminated body of dry tapes derived by laminating the dry tapes and shaping the laminated dry tapes according to a shape of an FRP is called a dry preform.

When a dry preform is used as a material for molding an FRP, the FRP is molded by the RTM method. Specifically, a process of impregnating fibers with uncured resin is performed by injecting the uncured resin into the dry preform, prior to the process of curing the resin.

As an example of device for widening the width of a dry tape, a fiber opening device disclosed in WO 2010/137525 pamphlet is known. Accordingly, the fiber opening device may be used as each of the width adjusting devices 11 when dry tapes are to be laminated by the fiber placement apparatus 1.

What is claimed is:

1. A roller unit for aligning tapes in a width direction and feeding the aligned tapes, the tapes being made of fibers which have not been impregnated with resin or have been impregnated with the resin,
the roller unit comprising:
rollers rotating by friction force between the tapes and the rollers when the rollers contact with the tapes, the rollers being aligned so that rotation axes of the rollers lie on a same straight line, diameters of the rollers being same as each other; and
a support shaft forming a single straight bar and supporting the rollers, through roller bearings provided on the support shaft, rotatably at rotational speeds independent from each other,
wherein inner surfaces of the rollers are supported by the roller bearings and support shaft as to preclude radial displacement of the inner surfaces of the rollers while the rollers rotate relative to the support shaft under a state of radial compression;
wherein each of the rollers, from an outer surface radially inward to the inner surface, represents a rigid body such that the outer surface of each roller avoids becoming deformed upon being placed in the state of radial compression and such that each of the rollers are precluded from radial displacement relative to the support shaft and to each other under the state of radial compression against an uneven underlying contact surface, and
wherein the rotation axis of each roller is coaligned with a central axis of the support shaft and wherein the rotation axis of each roller is configured to remain fixed in that position despite the rollers being placed in the state of radial compression on the uneven underlying contact surface.

2. The roller unit according to claim 1, wherein in a cross-section including an axis of rotation of the roller unit, the rollers are configured to be arranged in such a way that connected contours of outer surfaces of the rollers are two parallel straight lines.

3. A fiber placement apparatus comprising:
the roller unit according to claim 1.

4. A method of molding a composite material comprising:
laminating the tapes by feeding the tapes using the roller unit according to claim 1; and
(a) curing the resin with which the tapes have been impregnated, or
(b) injecting resin into the tapes which have not been impregnated with resin and curing the tapes.

5. The roller unit according to claim 1,
wherein the outer surfaces, which may contact with the tapes, each have a shape of a side surface of a cylinder, and
no gap is formed between each adjacent two of the outer surfaces so that the tapes are fed out by rotation of at least three of the rollers while coming into line contact with the at least three of the rollers slidably in a direction of the rotation axes, on longitudinal sections of the at least three of the rollers including rotation axes of the at least three of the rollers, when the tapes each has a width larger than a thickness of any one of the rollers.

6. A fiber placement apparatus comprising:
the roller unit according to claim 5.

7. A method of molding a composite material comprising:
laminating the tapes by feeding the tapes using the roller unit according to claim 5; and
(a) curing the resin with which the tapes have been impregnated, or
(b) injecting resin into the tapes which have not been impregnated with resin and curing the tapes.

8. The roller unit according to claim 5,
wherein the bearings have outer rings fixed to the inner surfaces of the rollers, the bearings further having inner rings fixed to the support shaft, wherein the rollers have steps in radial directions of the rollers, the steps decreasing thicknesses of the rollers toward the bearings, each of the steps reducing a contact area between end faces of corresponding adjacent two rollers of the rollers.

9. A fiber placement apparatus comprising:
the roller unit according to claim 8.

10. A method of molding a composite material comprising:
laminating the tapes by feeding the tapes using the roller unit according to claim 8; and
(a) curing the resin with which the tapes have been impregnated, or
(b) injecting resin into the tapes which have not been impregnated with resin and curing the tapes.

11. The roller unit according to claim 1,
wherein the bearings have outer rings fixed to the inner surfaces of the rollers, the bearings further having inner rings fixed to the support shaft,
wherein the rollers have steps in radial directions of the rollers, the steps decreasing thicknesses of the rollers toward the bearings, each of the steps reducing a contact area between end faces of corresponding adjacent two rollers of the rollers.

12. A fiber placement apparatus comprising:
the roller unit according to claim 11.

13. A method of molding a composite material comprising:
laminating the tapes by feeding the tapes using the roller unit according to claim 11; and
(a) curing the resin with which the tapes have been impregnated, or
(b) injecting resin into the tapes which have not been impregnated with resin and curing the tapes.

14. A roller unit for aligning tapes in a width direction and feeding the aligned tapes, the tapes being made of fibers which have not been impregnated with resin or have been impregnated with the resin,
the roller unit comprising:
rollers rotating by friction force between the tapes and the rollers when the rollers contact with the tapes, the rollers being aligned so that rotation axes of the rollers lie on a same straight line, diameters of the rollers being same as each other; and
a support shaft forming a single straight bar and supporting the rollers, through roller bearings provided on the support shaft, rotatably at rotational speeds independent from each other, and
wherein inner surfaces of the rollers are supported by the roller bearings and the support shaft as to preclude radial displacement of the inner surfaces of the rollers while the rollers rotate relative to the support shaft under a state of radial compression; and
wherein the rollers have outer surfaces, which may contact with the tapes, each having a shape of a side surface of a cylinder, and
wherein each of the rollers, from the outer surface radially inward to the inner surface, represents a rigid body such that the outer surface of each roller avoids becoming deformed upon being placed in the state of radial compression and such that each of the rollers are precluded from radial displacement relative to the support shaft and to each other under the state of radial compression against an uneven underlying contact surface, and
wherein the roller unit is configured such that neither a gap or a step is formable between each adjacent two of the outer surfaces, even when the roller unit is pressed on an uneven underlying contact surface, and so that, when the tapes each have a width larger than a thickness of any one of the rollers, the tapes are fed out at independent feeding speeds by rotation of at least two of the rollers, while the tapes are placed into line contact with longitudinal sections of at least three of the rollers, slidably in the direction of the rotation axis of the rollers.

15. The roller unit according to claim 14, wherein the rollers include rollers that have a first side defined by a radially outward step that forms the outer surfaces of said rollers and an annular recess positioned radially inward of the outward step, and a second side that is non-recessed, and wherein each of the first and second sides freely rotate relative to the support shaft, and wherein the non-recessed second sides of the rollers are in sliding abutment with the outer step of the first sides of the rollers.

16. A fiber placement apparatus comprising:
the roller unit according to claim 14.

17. A roller unit for aligning tapes in a width direction and feeding the aligned tapes, the tapes being made of fibers which have not been impregnated with resin or have been impregnated with the resin,
the roller unit comprising:
rollers rotating by friction force between the tapes and the rollers when the rollers contact with the tapes, the rollers being aligned so that rotation axes of the rollers lie on a same straight line, diameters of the rollers being same as each other; and
a support shaft forming a single straight bar and supporting the rollers, through roller bearings provided on the support shaft, rotatably at rotational speeds independent from each other, and
wherein the inner surfaces of the rollers are supported by the roller bearings and the support shaft as to preclude radial displacement of the inner surfaces of the rollers while the rollers rotate relative to the support shaft under a state of radial compression; and
wherein the rollers have outer surfaces, which may contact with the tapes, each having a shape of a side surface of a cylinder, and
wherein the rollers have a first side defined by a radially outward step that forms the outer surfaces of said rollers and an annular recess positioned radially inward of the outward step, and a second side that is non-recessed, and wherein each of the first and second sides freely rotate relative to the support shaft, and wherein the non-recessed second sides of the rollers are in sliding abutment with the outer step of the first sides of the rollers.

18. The roller unit according to claim 17, wherein each of the rollers represents a rigid body, from the outer surface radially inward to the inner surface, such that the outer surface of each roller avoids becoming deformed upon being placed in the state of radial compression.

19. The roller unit according to claim 17,
wherein the bearings have outer rings fixed to the inner surfaces of the rollers, and the bearings have inner rings fixed to the support shaft.

20. A fiber placement apparatus comprising:
the roller unit according to claim 17.

* * * * *